J. T. TILLMAN.
ENVELOP SEALING AND STAMPING MACHINE.
APPLICATION FILED OCT. 2, 1916.

1,312,597.

Patented Aug. 12, 1919.
8 SHEETS—SHEET 1.

Inventor
Joseph T. Tillman by John E. Stryker Atty.

J. T. TILLMAN.
ENVELOP SEALING AND STAMPING MACHINE.
APPLICATION FILED OCT. 2, 1916.

1,312,597.

Patented Aug. 12, 1919.
8 SHEETS—SHEET 3.

Inventor
Joseph T. Tillman by John E. Stryker Atty.

J. T. TILLMAN.
ENVELOP SEALING AND STAMPING MACHINE.
APPLICATION FILED OCT. 2, 1916.

1,312,597.

Patented Aug. 12, 1919.
8 SHEETS—SHEET 5.

Inventor
Joseph T. Tillman
by John E. Stryker  Atty.

J. T. TILLMAN.
ENVELOP SEALING AND STAMPING MACHINE.
APPLICATION FILED OCT. 2, 1916.

1,312,597.

Patented Aug. 12, 1919.
8 SHEETS—SHEET 6.

Inventor
Joseph T. Tillman
by John E. Styka atty.

J. T. TILLMAN.
ENVELOP SEALING AND STAMPING MACHINE.
APPLICATION FILED OCT. 2, 1916.

1,312,597.

Patented Aug. 12, 1919.
8 SHEETS—SHEET 7.

Inventor
Joseph T. Tillman by John E. Stryker Atty.

J. T. TILLMAN.
ENVELOP SEALING AND STAMPING MACHINE.
APPLICATION FILED OCT. 2, 1916.

1,312,597.

Patented Aug. 12, 1919.
8 SHEETS—SHEET 8.

Inventor
Joseph T. Tillman by John E. Stryker atty.

UNITED STATES PATENT OFFICE.

JOSEPH T. TILLMAN, OF MINNEAPOLIS, MINNESOTA.

ENVELOP SEALING AND STAMPING MACHINE.

1,312,597.   Specification of Letters Patent.   Patented Aug. 12, 1919.

Application filed October 2, 1916. Serial No. 123,326.

*To all whom it may concern:*

Be it known that I, JOSEPH T. TILLMAN, a citizen of the United States, residing at Minneapolis, in the county of Hennepin and State of Minnesota, have invented new and useful Improvements in Envelop Sealing and Stamping Machines, of which the following is a specification.

My invention relates to improvements in envelop sealing and stamping machines.

It is my object to produce a simple and efficient machine for automatically closing and sealing and affixing a stamp on an envelop.

A further object is to produce a machine having coördinated sealing and stamping devices, the operation of either of which may be instantly suspended without impairing the operation of the other.

A further object is to supply a machine of this kind with automatic feeding mechanism adapted to receive quantities of envelops piled one upon another with the flaps in normal position, and a flap moistening device adapted to efficiently dampen the gummed portions of the flaps and means for sealing the same without appreciably disturbing the normal position of the flaps.

A further object is to produce a machine adapted to accommodate, without readjustment, and to uniformly stamp, envelops of various sizes and designs containing either thick or thin inclosures.

A further object is to provide a machine of this kind in which a series of stamps in strip or ribbon form may be employed and in which the first and last stamps of the series, as well as intervening ones, are effectually affixed to envelops.

Another object is to provide a machine of this class which will accurately place and partially affix each stamp upon an envelop before said stamp is severed from the strip.

A further object is to employ the stamp affixing means as a medium to sever the stamps from the stamp strip, thereby simplifying the machine and promoting its accuracy in operation.

These and many other objects are attained, which will be hereinafter particularly described and pointed out in the claims.

In the accompanying drawings.

I supply in my machine mechanism for feeding envelops, means to moisten the flaps thereof, means to advance and seal the envelops and stamp feeding mechanism to supply moistened stamps to said envelops as they advance through said sealing means.

Figures 3, 4:
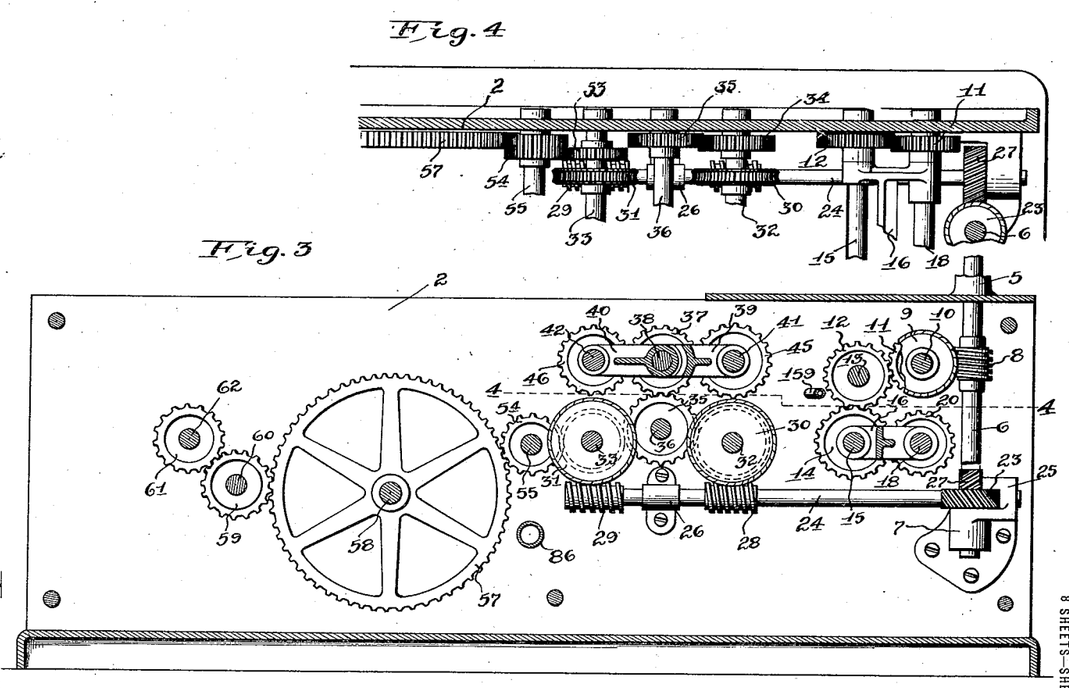
Fig. 3 is a longitudinal sectional view taken on the line 3—3 of Fig. 2.
Fig. 4 is a detail sectional view taken on the line 4—4 of Fig. 3.
Figure 5:
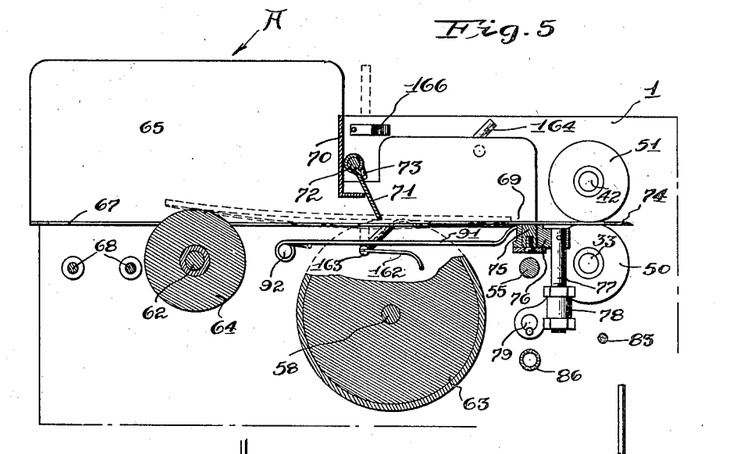
Fig. 5 is a detail sectional view taken on the line 5—5 of Fig. 2 and illustrates the envelop feeding mechanism and flap moistening device.
Figure 6:
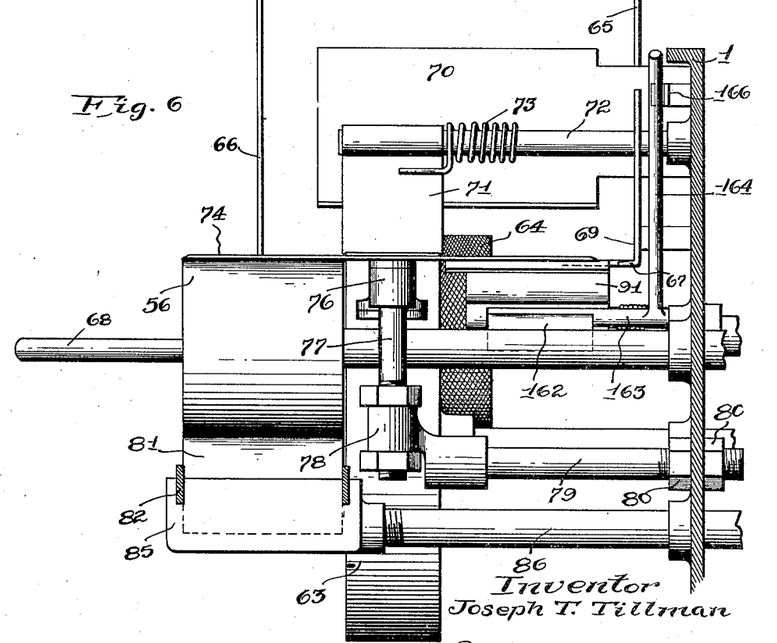
Fig. 6 is an enlarged sectional view in detail taken on the line 6—6 of Fig. 2 and shows an end elevation of the parts illustrated in Fig. 5.
Figure 7:
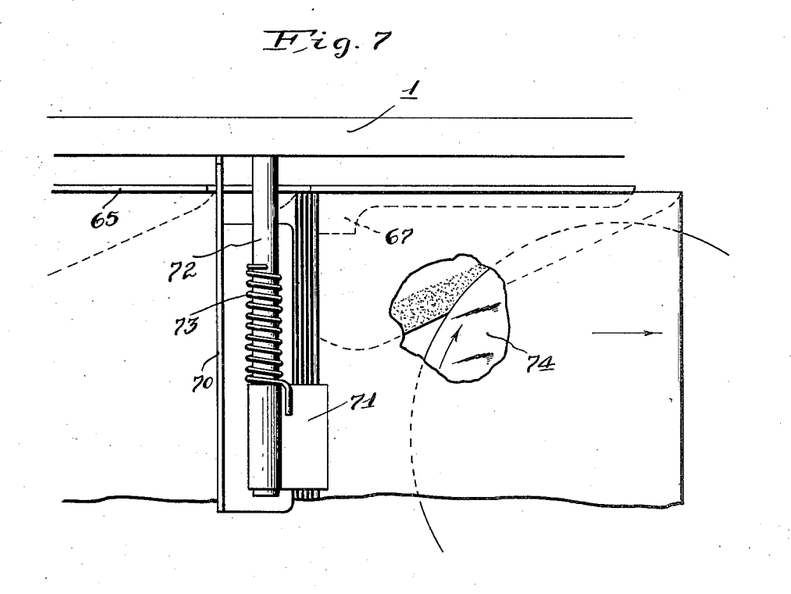
Fig. 7 is an enlarged plan view in detail, showing the moistening disk in the act of dampening the flap of an advancing envelop.
Figure 8:
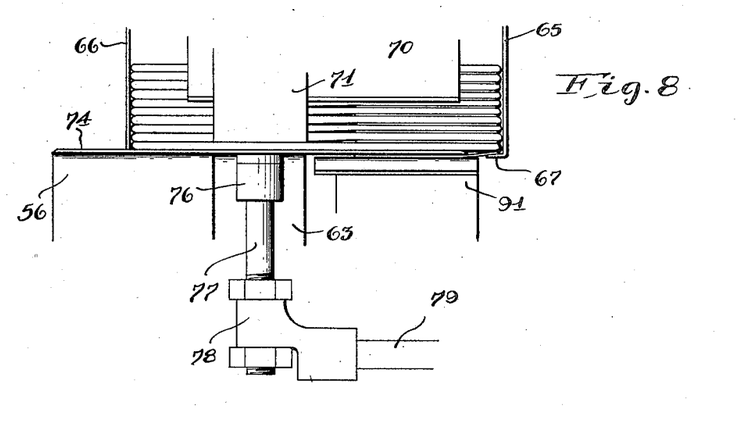
Fig. 8 is an enlarged end elevation of the parts shown in Fig. 7.

Reference being had to the accompanying drawings, it will be seen that my machine consists of a frame having parallel walls 1 and 2 and a base 3 to which said walls are secured. A crown plate 4 rests upon the walls 1 and 2 and a bearing 5 on said plate revolubly receives the upper end of a main drive shaft 6 which is supplied with a second bearing 7 on the wall 2 of the frame. Said plate 4 forms a convenient support for a motor or other source of power, which may be connected with said shaft in any suitable manner. A worm gear 8 on the main drive shaft 6 meshes with a worm wheel 9 on a shaft 10 which is journaled in the walls of the frame and projects beyond the wall 1 thereof. A spur gear 11 on said shaft meshes with a gear 12 on an idler shaft 13 and said gear 12 in turn meshes with another gear 14 on a second idler shaft 15. A link 16 pivoted on said second shaft 15 and supplied with an upwardly extended tension spring 17 revolubly supports a shaft 18 which projects through a slot 19 in the wall 1 of the frame and is driven through a gear 20 by said gear 14 on said second shaft 15. The projecting ends of the shafts 10 and 18 are respectively furnished with rollers 21 and 22, having frictional surfaces, preferably of rubber. These rollers rest one above the other, the lower roller 22 being yieldingly pressed against the upper roller 21 by the action of said tension spring 17. A second worm gear 23 is mounted upon the vertical drive shaft 6 and a horizontal countershaft 24, revoluble in bearings 25 and 26 on the rear side of the frame, is driven from said worm gear 23 through a worm wheel 27 on the countershaft 24. This countershaft is supplied with two worm gears 28 and 29, which mesh respectively with worm wheels 30 and 31 on shafts 32 and 33 journaled in the sides of the frame and projecting beyond the front side thereof. A spur gear 34 on the shaft 32 meshes with a gear 35 on an idler shaft 36 and said gear 35 in turn meshes with a gear 37 on another idler shaft 38 near the top of the frame. Links 39 and 40 respectively support shafts 41 and 42, which project through slots 43 and 44 in the wall 1. These shafts 41 and 42 are respectively driven through gears 45 and 46 from the gear 37 on the idler shaft 38. The projecting end of the shaft 32 carrier a roller 47 and a similar roller 48 on the end of the oscillating shaft 41 is yieldingly held against the top of said roller 47 by the action of a spring 49 attached to the link 39. The projecting end of the shaft 33 is also supplied with a roller 50 and a similar roller 51 on the end of the oscillating shaft 42 is yieldingly held against the top of said roller 50 by the action of a spring 52 attached to the link 40. A spur gear 53 mounted upon the shaft 33 (Fig. 4) meshes with a gear 54 on a shaft 55 journaled in the frame and passing beyond the wall 1. This projecting end of said shaft is supplied with a disk-driving and moistening roller 56 hereinafter described. Said gear 54 on said shaft 55 meshes with a large spur gear 57 which is mounted on a shaft 58. This shaft is journaled in the walls 1 and 2 and projects through said wall 1. Said large gear 57 meshes with a gear 59 on an idler shaft 60 and said gear 59 in turn meshes with a spur gear 61 on a shaft 62 which is also journaled in the walls 1 and 2 and projects through the wall 1. Feed rollers 63 and 64 are respectively mounted on the projecting ends of said shafts 58 and 62. These rollers have frictional surfaces, preferably of rubber; the surface of the roller 64 being roughened by nurling or forming knobs thereon. On the front end of the frame and above said feeding rollers 63 and 64, I arrange a hopper A for envelops, which consists of two spaced upright side plates 65 and 66 having their lower edges turned inward to form slides 67. The plate 65 is rigidly secured to the wall 1 and the plate 66 is slidable horizontally upon rods 68 threaded in said wall 1 for the purpose of adjusting the hopper to envelops varying in width. A pack of envelops placed in the hopper A rests upon the feeding rollers 63 and 64 and the lower inner margin of the plate 65 forms a gage 69 for the flap edge of the envelops as they are fed from the hopper by said rollers. An end wall 70 placed transversely in the hopper holds back the envelops in the upper part of a pack (Figs. 7 and 8) and a finger 71 pivoted on a stud 72 and yieldingly pressed by a coiled spring 73 against the feed roller 63 retains all of the envelops in the lower part of the pack except the bottom envelop, which must be entirely removed from the hopper before the removal of the next envelop commences. A moistening disk 74 mounted to turn horizontally is arranged to pass between the body and flap of each envelop as it is fed endwise from the hopper (Figs. 5, 7 and 8). A depending journal 75 on said disk turns in a bearing 76 on a vertically adjustable post 77. Said post is supported in a bearing 78 on the end of a horizontal stud 79 which is supplied with nuts 80 to adjust said stud longitudinally and secure the same to the wall 1. The roller 56 above described contacts with the lower outer side of said disk 74 radially and turns it in the direction indicated in Fig. 7. An idler roller 81 revoluble in a yoke 82, which is pivotally mounted upon a stud 83, is pressed against the lower side of the roller by the action of a spring 84 coiled upon said stud 83, and said idler roller dips into water contained in a cup 85, which is mounted upon and filled through a pipe 86 passing through the frame of the machine. At the back of the machine a second cup 87 is fitted upon said pipe 86 and a reservoir 88 empties into said cup.

Figures 20, 21, 22:
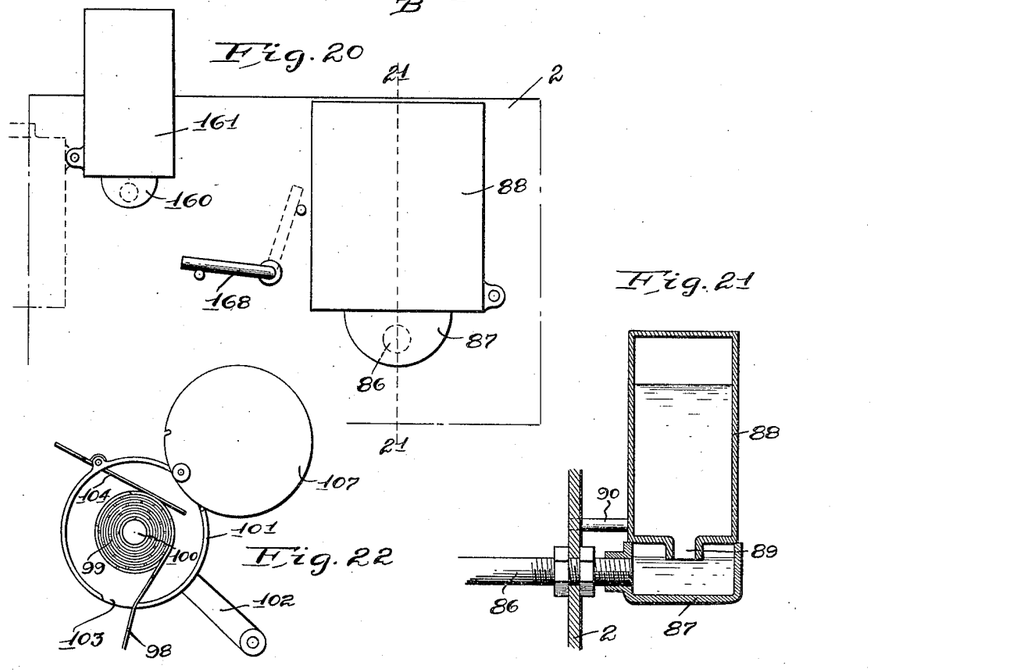
Fig. 20 is a fragmentary rear elevation of my machine and illustrates the water reservoirs and the lever which is employed to suspend the operation of the stamping device.
Fig. 21 is a detail sectional view taken on the line 21—21 of Fig. 20.
Fig. 22 is a detail elevation of the stamp container.

Said reservoir is normally inverted, the effluent opening 89 therein being sealed by water in the cup 87. (Figs. 20 and 21.) A pin 90 forming a pivotal and detachable mounting for said reservoir 88 provides for conveniently removing and replacing the same, so that the water supply may be replenished without waste. While I preferably employ the roller 56 to drive the disk and also to moisten it, it is apparent that said disk may be driven through simple gearing from the shaft 56, or by other means and that the roller 56 may then be an idler. A plate 91 pivoted on a pin 92 in the frame is yieldingly held against the lower side of the disk 74 and lightly presses the flaps of advancing envelops against said side of said disk. The advancing rollers 50 and 51 receive the envelops as they are fed from the hopper A and together with the sealing rollers 47, 48 and 21, 22 carry said envelops through the machine. Co-acting sealing lips 93, 94 and 95, 96 on opposite sides of the rollers 47, 48, assist said sealing rollers in securely sealing the moistened envelop flaps. Said sealing lips are mounted upon pins projecting from the frame of the machine, the lips 94 and 95 being rigid, while the lips 93 and 96 are capable of tilting movements, and springs 97 are arranged to yieldingly hold said movable links against their companion lips.

Figure 9:
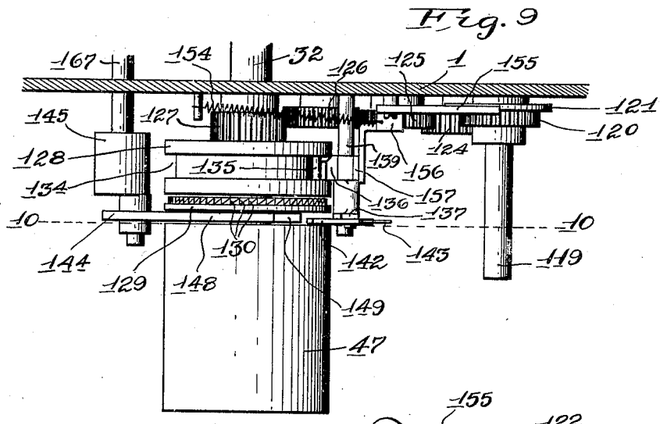
Fig. 9 is a detail plan view illustrating the principal parts of the stamp feeding mechanism.
Figures 10, 11, 12, 13:
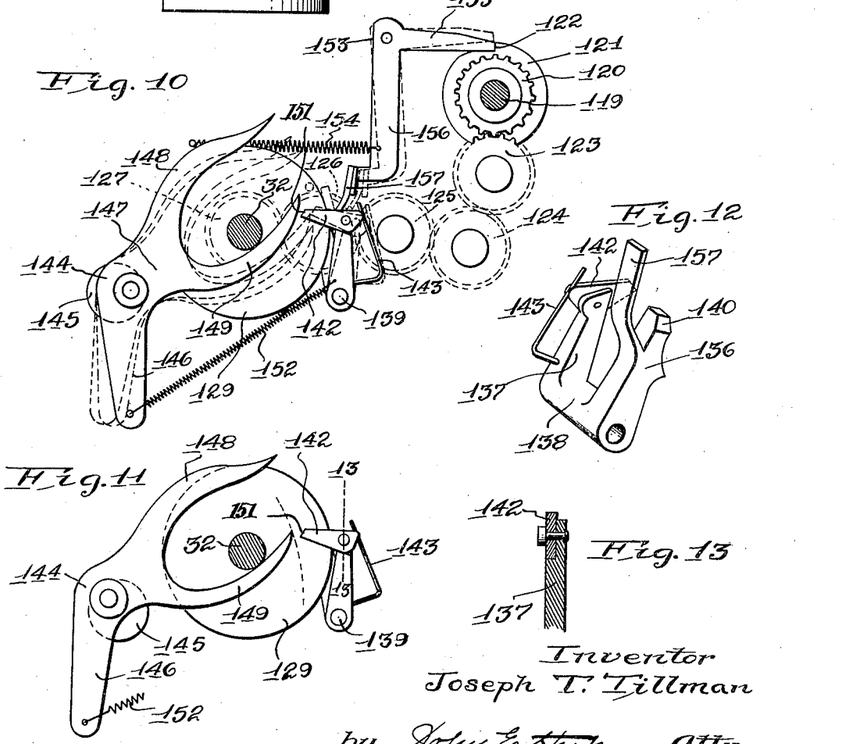
Fig. 10 is a detail sectional view taken on the line 10—10 of Fig. 9.
Fig. 11 is a similar detail view and shows a position of the parts of the tripping mechanism, wherein the operation of said mechanism is suspended.
Fig. 12 is a detail perspective view of one of said parts.
Fig. 13 is a detail sectional view taken on the line 13—13 of Fig. 11.
Figure 14:
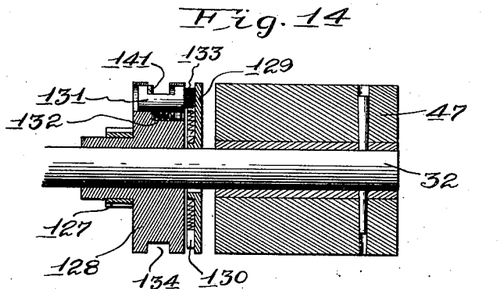
Fig. 14 is a longitudinal sectional view in detail of one of the sealing and advancing rollers and certain parts of the tripping mechanism associated therewith.
Figures 15, 16:
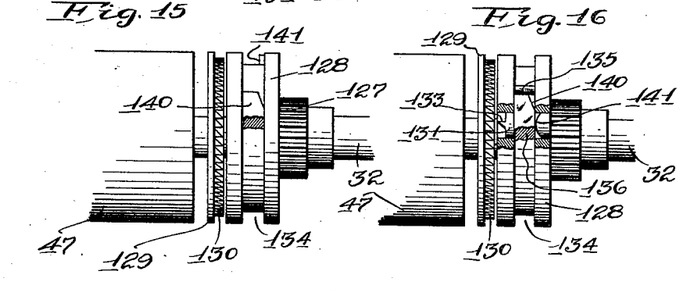
Figs. 15 and 16 are fragmentary elevations of the same, showing two positions thereof.
Figures 17, 18:
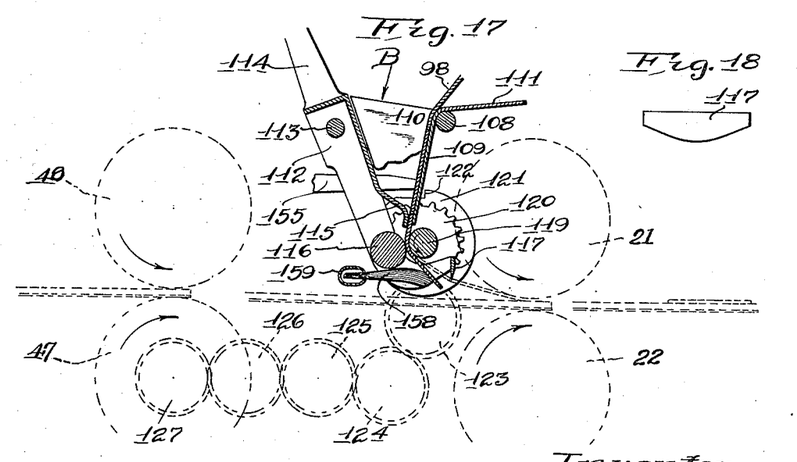
Fig. 17 is a detail sectional view of the stamp guide, stamp feeding roller and moistening brush, in which various positions of an envelop in the sealing rollers are illustrated, and also various positions of the stamp strip with respect to said envelop.
Fig. 18 is an end view in detail of the stamp tearing blade.
Figure 19:
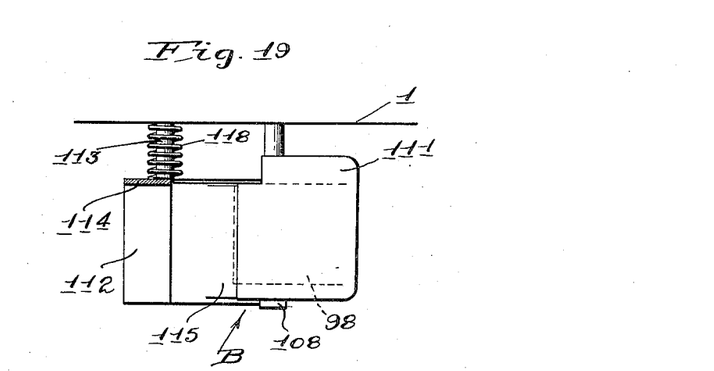
Fig. 19 is a detail plan view of the stamp guide.

Stamps arranged side by side in the form of a ribbon or strip 98 (Fig. 22), having perforations between the individual stamps, are employed. The stamp strip is wrapped in a coil 99 about a stud 100 in a cylindrical casing 101, which is carried on an arm 102 pivotally secured upon the wall 1. Said stamp strip 98 passes through a slot 103 in the bottom of the casing and a tension finger 104, entering the casing 101 through a slot 105 in the top thereof, is yieldingly held by a spring 106 against the coil 99. A cover 107, pivoted on the casing 101, may be swung aside to permit access thereto. The stamp guide B, beneath the stamp casing 101, comprises a rigid member and a tiltable member. The former is a single piece of metal supported upon a pin 108 and bent to form a slide 109, a gage 110 for the stamp strip, and a rest 111 for the stamp casing 101. The tiltable member of said stamp guide B is made up of a frame 112, which is pivoted on a stud 113 and supplied with a tilting lever 114, a spring clip 115, an idler roller 116, and a tearing blade 117. A spring 118 coiled about the stud 113 engages the frame 112 and holds said frame in such position that the stamp strip 98 is yieldingly engaged between said spring clip 115 and slide 109 and also between the idler roller 116 and a stamp feeding roller 119. Said stamp feeding roller 119 is journaled at its inner end in the wall 1 of the machine and is supplied with a spur gear wheel 120, having an annular flange 121 notched to form a stop 122. A train of idler gears 123, 124, 125 and 126 all journaled on the frame of the machine connects said spur gear 120 with a gear 127 on a loosely mounted clutch member 128 on the shaft 32 (Fig. 9). A companion clutch member 129 is fixed upon said shaft 32, the side adjacent to said loose clutch member 128 being notched radially to form teeth 130. A dog 131 slidable transversely in the clutch member 128 is supplied with an expansion spring 132 adapted to shift the dog 131 and engage a tooth 133 thereon with the teeth 130 in the companion clutch member 128. Said clutch member 128 has a peripheral groove 134 therein and is provided with a stop pin 135 crossing said groove. A latch lever 136 and trip lever 137 (Fig. 12), having a common bearing 138 mounted upon a stud 139, are arranged so that the free end of the former may pass into and out of the groove 134 in the clutch member 128. The latch lever 136 is beveled at 140 (Figs. 12, 15 and 16) and said beveled portion is adapted to engage a cam shoulder 141 on the dog 131 to shift said dog and withdraw the tooth 133 from engagement with the clutch member 129. The stop pin 135 is located near the dog 131 and strikes the end of the latch lever 136 immediately after the clutch members are disengaged. The trip lever 137 is equipped with a dog 142 which is yieldingly held by a spring 143 in position shown in solid lines in Figs. 10 and 11, said dog being capable of tilting only in an upward direction (see dotted lines Fig. 10). A bell crank 144 (Fig. 10), mounted on an eccentric block 145, has a depending arm 146 and an upwardly inclined bifurcated actuating arm 147, the branches 148 and 149 of said arm 147 passing upon opposite sides of the shaft 32 and between the inner end of the sealing roller 47 and the fixed clutch member 129. The upper branch 148 also moves in a groove 150 in the sealing roller 48 above said roller 47. This branch 148 of the actuating arm 147 lies in the path of the envelops and when engaged by an advancing envelop is depressed. (See dotted lines, Fig. 10). The lower branch 149 of the arm 147 is arranged to strike the beveled end 151 of the dog 142 when the upper branch 148 is lowered, and throws back the trip lever 137. A coiled spring 152 stretched between the arm 146 and trip lever 137 normally holds said arm and trip lever in their respective elevated and forward positions (Fig. 10). Backward movement of the trip lever 137 shifts the latch lever 136 from engagement with the stop pin 135 on the loose clutch member 128 and releases the dog 131 which connects the two clutch members, thereby causing the rotation of the stamp roller 119. When an envelop passes the rollers 47 and 48, the actuating arm 147 rises to normal position, the lower branch 149 thereof tilting the dog 142 upward in passing. The action of the spring 152 returns the latch lever 136 to the groove 134 in the loose clutch member 128, and said lever releases the dog 131 and locks said clutch member at the completion of its revolution as above described. The gears between the loose clutch member 128 and stamp feeding roller 119 are proportioned to complete one revolution of the stamp feeding roller upon each revolution of said clutch member 128 and I provide for locking said roller 119 as well as the clutch member 128 at the end of each revolution, so that wear in the gearing between them will not affect their relative positions. A bell crank 153 actuated by a spring 154 is mounted on the frame of the machine, one arm 155 being arranged to co-act with the stop 122 on the gear 120 and the other arm 156 being arranged in the path of a lug 157 on the latch lever 136. The arm 155 is lifted from engagement with the stop 122 simultaneously with the release of the trip lever 136 from the stop pin 135 on the clutch member 128, and said arm 155 is held in elevated position by the annular shoulder 121 until the revolution of the feeding roller 119 is nearly completed, when it drops into the notch in said shoulder and finally abuts against said stop 122 at the completion of said roller's revolution. A brush 158, mounted upon, and supplied with water from, a tube 159, is arranged beneath the feeding roller 119 to moisten the gummed side of the advancing stamp strip 98. Said tube 159 passes through the frame of the machine and is provided with a cup 160 and replenishing reservoir 161 therefor, similar to the cup 87 and reservoir 88, heretofore described. The stamp strip 98 is originally set as shown in solid lines in Fig. 17, the end thereof being passed through the stamp guide B, while the tiltable member of said guide is held back by the lever 114. The movement of the feeding roller 119 is timed with respect to the movement of an advancing envelop so that the rotation of said roller 119 is completed when the first line of perforations in the stamp strip 98 registers with the tearing blade 117, at which time the end of the advancing envelop and forward margin of the first stamp are caught between the sealing rollers 21 and 22 (Fig. 17). These rollers 21 and 22 tear the strip 98 upon said first line of perforations and fix the remainder of the stamp upon the envelop as it passes through said rollers and out of the machine. The stamp guide B is located with respect to the gage 69 and the movement of the stamp feeding roller 119 is timed with respect to the movement of an advancing envelop so that a stamp is affixed to said envelop in the proper position.

The advancing rollers 50 and 51 and sealing rollers 47, 48 and 21, 22 advance the envelops uniformly and at a rate of speed slightly greater than that at which they are delivered from the hopper A, so that sufficient space is left between two advancing envelops to permit the return of the actuating arm 147 to normal position. It will be noted that said advancing and sealing rollers are all power driven and that one of each pair of rollers is self-adjustable to take up wear and to readily permit the passage of envelops therethrough.

Figure 1:
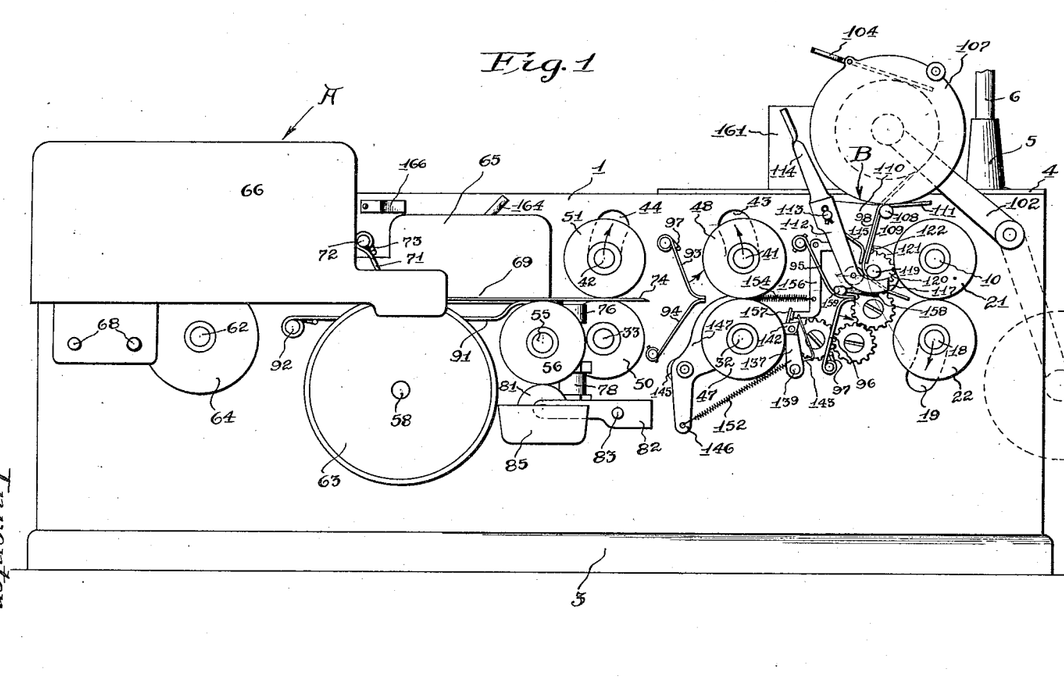
Figure 1 is a front elevation of a machine embodying my invention.
Figure 2:
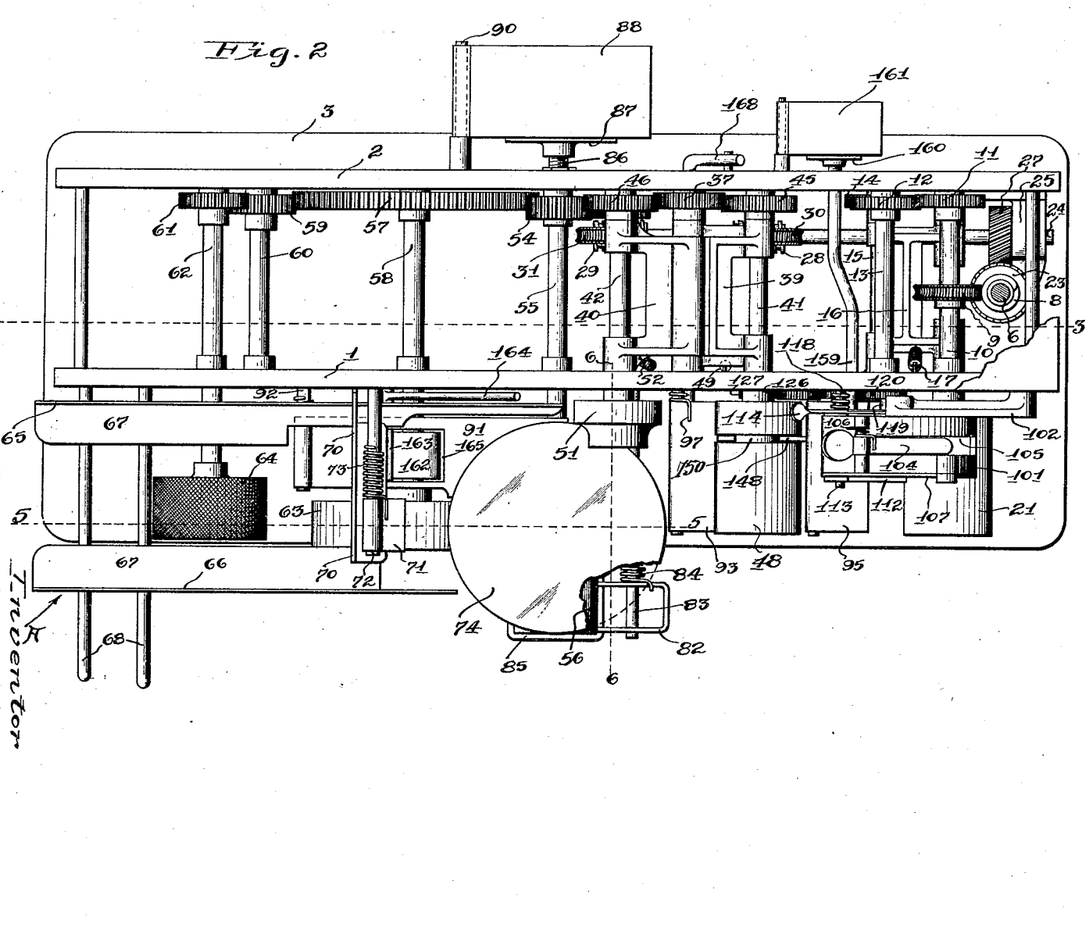
Fig. 2 is a plan view thereof, certain parts being removed to show the interior mechanism.

Simple means are furnished to prevent the moistening of advancing envelops so that when desired they may be stamped and not sealed as they pass through the machine. A flap guide 162 is mounted upon a shaft 163 having a lever 164 to turn the same. Said guide is arranged beneath the hopper A and moves through a slot 165 in the plate 91 (Figs. 2 and 5). When the guide 162 is elevated, it bears against and closes the flap of the lowermost envelop in the hopper A and directs said flap above the disk 74, thereby preventing the contact of the gummed portion thereof with the lower wet side of the disk 74. When the guide 162 is depressed (heavy lines, Fig. 5) the flaps are unobstructed thereby and pass beneath the disk as heretofore described. A spring catch 166 is attached to the frame to secure the lever 164 and hold the guide 162 in elevated position.

Simple means are also provided to render the stamp mechanism inoperative. This consists of a shaft 167, which carries the eccentric block 145 upon which the actuating arm 147 is mounted. Said shaft is supplied with a lever 168 (solid lines, Fig. 20) which shifts said actuating arm 147 from operative position (Fig. 10) to inoperative position (Fig. 11), wherein the lower branch 149 of said arm is incapable of striking the dog 142 on the trip lever 137.

It will thus be noted that either the sealing or stamping of the envelops or both may be instantly and easily arrested, even while the machine is in operation, without cutting off the water supply or disturbing the stamps. This arrangement avoids labor, increases the efficiency of the machine and eliminates the disadvantage of moistening envelops at a time when it is not desirable to seal them.

In operation, I supply my machine with a bunch of envelops, arranged with the address sides up and the flaps in normally folded position. The feeding rollers 64 and 63 advance said envelops one at a time from the bottom of the pack and push them toward the revoluble moistening disk 74, which is then inserted between the body and flap of the advancing envelop. While in this position, the flap is pressed by the plate 91 against the bottom of said disk, which is revolving and supplied with water from the roller 56. The flap-edge of the envelop is guided by the gage 69 and the rotation of the disk aids in propelling said envelop and holding the same against said gage. The coöperating rollers 50 and 51 receive the envelop and carry it to the sealing and advancing rollers 47 and 48, which in turn move said envelop to the sealing and advancing rollers 21 and 22. Sealing lips 93, 94 and 95, 96 between said sets of sealing rollers assist in securely sealing the flap of the envelop. The arm 147 is now actuated by the advancing envelop and initiates the rotation of the stamp feeding roller 119 which withdraws the stamp strip 98 from the casing 101, through the stamp guide B, and feeds said strip past the moistening brush 158 to said envelop, whereupon the rollers 21 and 22 grip the envelop and stamp strip. Continued rotation of said rollers 21 and 22 tears a stamp from the strip 98 and affixes the same to the envelop as it passes from the machine. As hereinbefore described, either or both the sealing and stamping means may be rendered inoperative at will.

Having described my invention, what I claim as new and desire to protect by Letters Patent, is:

1. In a machine of the class described, rollers to advance envelops in series, an actuating arm in the path of said envelops, a normally idle clutch mechanism on one of said rollers, a stamp feeding roller, a train of gears connecting said clutch mechanism and stamp feeding roller, the movement of said arm by an envelop being adapted to cause the operation of the clutch mechanism, and independent locks to secure said clutch mechanism and stamp feeding roller upon each complete revolution of the latter.

2. In a machine of the class described, mechanism to successively feed envelops, coöperating pairs of rollers adapted to carry the envelops through the machine, a guide for a perforated strip of stamps, a feeding roller co-acting with the guide and bearing against the strip, a moistening brush adjacent to said guide adapted to wet the gummed sides of the stamps before said stamps are severed from the strip, and mechanism to intermittently turn said feeding roller and designed to be set in motion by a passing envelop, said roller being adapted to feed the strip between a pair of said sealing rollers simultaneously with the introduction of said envelop thereto, and said sealing rollers being adapted to tear a stamp from the strip and affix the same to the envelop.

3. In a device of the class described, means to successively feed envelops thereto, power driven coöperating rollers yieldingly held together and adapted to advance the envelops in series, a guide for a strip of stamps, a moistening brush for the stamps adjacent to said guide, and mechanism actuated by each passing envelop designed to advance said strip and insert the end thereof between certain of said coöperating rollers, substantially simultaneously with the introduction of an envelop between such rollers, said rollers being adapted to sever a stamp from said strip and affix the same to said envelop.

4. In an envelop stamping machine, mechanism adapted to move envelops singly through the machine, an actuating arm in the path of said envelops adapted to be shifted by the envelops and thereby inaugurate the movement of an intermittently revoluble clutch member, a train of gears connected with said clutch member, a stamp feeding roller in mesh with said gears, a pair of coöperating sealing rollers, said stamp feeding roller being adapted to advance a stamp and place the end thereof between the sealing rollers substantially simultaneously with the introduction of an envelop therebetween, a stop for said stamp feeding roller adapted to lock said roller at the completion of each revolution, and a moistening brush adjacent said stamp feeding roller adapted to moisten the stamp advanced thereby.

5. In a machine of the class described, an envelop hopper formed with an opening near the bottom of one end thereof, a spring-pressed finger hinged adjacent to said end and adapted to overlap said opening, a power driven roller in the bottom of said hopper and a second driven roller, of greater diameter than the first, beneath and in peripheral contact with said finger, said rollers and finger coöperating to eject envelops from said hopper one at a time with spaces between the ends of adjacent envelops, means to further advance said envelops through the machine, and means to affix a stamp to each envelop.

6. In an envelop stamping machine, mechanism adapted to move envelops singly through the machine, an actuating arm in the path of said envelops adapted to be shifted by the envelops and thereby inaugurate the movement of an intermittently revoluble clutch member, a train of gears connected with said clutch member, a feeding roller (carrying a strip of stamps) in mesh with said gears, a pair of coöperating sealing rollers, said stamp feeding roller being adapted to advance a stamp and place the end thereof between the sealing rollers substantially simultaneously with the introduction of an envelop therebetween, a stop for said stamp feeding roller adapted to lock said roller at the completion of each revolution, a moistening brush, adjacent said stamp feeding roller, adapted to moisten the stamp advanced thereby, and a knife adjacent said stamp feeding roller and adapted to sever a stamp from said roller.

7. In a machine of the class described, an open bottomed hopper adapted to receive envelops with their flap sides down, a power driven roller beneath said hopper with its periphery in contact with the bottom envelop in said hopper, said hopper having an opening across one end thereof near the bottom, a spring-pressed finger hinged adjacent to said end and adapted to overlap said opening, a power driven roller of greater diameter than said first-named roller arranged beneath and in peripheral contact with said finger, said rollers and finger being adapted to eject envelops one at a time from said hopper with their adjacent ends spaced apart, rollers to advance the envelops through the machine, an arm lying in the path of said envelops and adapted to be depressed thereby to actuate a train of gears, a stamp guide, a stamp feeding roller in mesh with said gears and co-acting with said stamp guide to advance a stamp upon each depression of said arm, means beneath said stamp roller to moisten said stamps, and means for affixing the stamps severally to the envelops.

8. In a machine of the class described, envelop carrying means, a guide for stamps arranged in a continuous strip, means to feed a stamp to each advancing envelop, said carrying means being also adapted to affix and sever said stamps, and a tearing blade over which said strip is drawn when a stamp is severed.

9. In a machine of the class described, means to advance an envelop through the machine, including a pair of coöperating stamp sealing rollers, a frictional guide for stamps arranged side by side in a continuous strip, a feeding roller in contact with said strip, the circumference of said roller being equal to the width of a stamp, means actuated by an advancing envelop adapted to set said roller in motion, means to moisten the strip, and a lock to arrest the motion of said roller at the completion of one revolution, said roller being adapted to advance a stamp to said sealing rollers simultaneously with the passage of an envelop therethrough.

10. In a machine of the class described, a frame, a power driven shaft, a roller on said shaft, a second roller co-acting with said first mentioned roller, said rollers being adapted to advance an envelop and having registering annular grooves therein, an actuating arm in said grooves arranged in the path of and designed to be moved by a passing envelop, clutch mechanism on said shaft connected with said arm, a stamp guide, a stamp feeding roller co-acting with said guide, a lock coöperating with said clutch mechanism and adapted to secure the stamp feeding roller at the completion of each revolution of said roller, a moistening brush adapted to wet the stamps advanced by said roller, and gearing positively connecting said clutch mechanism and roller.

11. In a machine of the class described, means to advance an envelop through the machine, including a pair of coöperating stamp sealing rollers, a guide for stamps arranged side by side in a continuous strip, a feeding roller in contact with said strip, the circumference of said roller being equal to the width of a stamp, means actuated by an advancing envelop to set said roller in motion, a brush adjacent said feeding roller adapted to moisten the gummed side of the strip, and means to wet the brush, said roller being adapted to advance a stamp to said sealing rollers simultaneously with the passage of an envelop therethrough.

Whereof, I have hereunto subscribed my name to this specification.

JOSEPH T. TILLMAN.

Copies of this patent may be obtained for five cents each, by addressing the "Commissioner of Patents, Washington, D. C."